United States Patent

[11] 3,581,065

[72] Inventors Yoshikazu Hatsukano;
   Kosei Nomiya, both of Kodaira-shi, Japan
[21] Appl. No. 685,047
[22] Filed Nov. 22, 1967
[45] Patented May 25, 1971
[73] Assignee Hitachi, Ltd.
   Tokyo, Japan
[32] Priority Dec. 2, 1966
[33] Japan
[31] 41/78,684

[54] ELECTRONIC DISPLAY SYSTEM
   14 Claims, 19 Drawing Figs.
[52] U.S. Cl. .................................................. 235/92,
   315/84.6
[51] Int. Cl. ....................................................... H03k 21/22
[50] Field of Search .......................................... 235/92;
   315/84, 6

[56] References Cited
   UNITED STATES PATENTS
3,217,145 11/1965 Suski ........................... 235/92
3,358,125 12/1967 Rinaldi .......................... 235/92
3,414,764 12/1968 Kawamoto .................... 315/84.6
2,937,318 5/1960 Chao ............................. 315/84.6

Primary Examiner—Maynard R. Wilbur
Assistant Examiner—Robert F. Gnuse
Attorney—Craig and Antonelli ABSTRACT: This specification discloses an electronic display system for an information processing apparatus adapted for visual display of information through the use of indicator tubes. In the present system, a shift register and change over switch means for periodically and sequentially distributing the operating potential to the anode of each indicator tube are provided for the purpose of simultaneously and effectively operating the plurality of indicator tubes by means of a single common control device comprising a single driving circuit, decoder circuit and gate circuit connected with the indicator tubes. Thus, an information signal is periodically and sequentially read out by means of the gate circuit, whereby the control device is operated, and the changeover switch means is operated in synchronism with said information signal to cause the indicator tubes to be periodically glow-discharged.

FIG. I
PRIOR ART

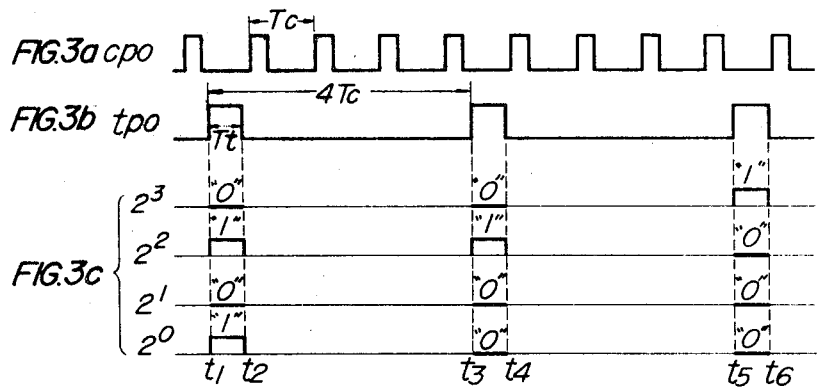
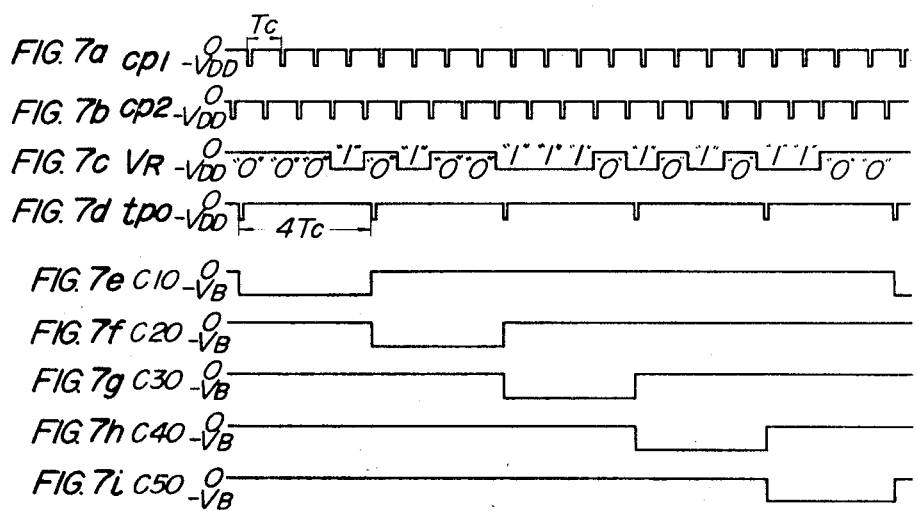

ELECTRONIC DISPLAY SYSTEM

This invention relates to an electronic display system using a plurality of indicator tubes to visually display information, and more particularly it pertains to such electronic display system for enabling said plurality of indicator tubes to be lighted by means of a single control device.

In an electrical cash register, computer and other information processing apparatus, a display device using a plurality of indicator tubes is needed for the visual display of the processed information. The indicator tubes used in such device are gas-filled envelopes each incorporating a plurality of cathodes and a common anode, wherein the numerals represented by the cathodes correspond to those representing the information elements of the information to be displayed. In case numerical information is to be visually displayed, for example, each indicator tube should have 10 cathodes representing the numerals "0" to "9." The number of the indicator tubes used in the display apparatus depends upon the quantity of information. For example, 16 indicator tubes are needed to display 16-digits numerical information.

In general, the information to be displayed which is provided by the information processing circuit is electronically stored by way of binary signals. The binary signals thus stored are in turn converted to electrical signals controlling the indicator tubes by decoders. Then, the electrical signals control the indicator tubes through amplifiers. The decoders are independently provided in correspondence with the respective indicator tubes, and the amplifiers are associated with the cathodes of the respective indicator tubes. This means that such apparatus has a disadvantage that a number of control elements is needed to achieve the connection between the cathodes of the respective indicator tubes and the register. For example, 10 decoders are needed to reproduce information represented by a 10-digits decimal number, for example. In addition, 100 amplifiers should be connected with the cathodes of the indicator tubes. Since, in fact, the indicator tubes are operated at a high voltage, the amplifiers controlling the indicator tubes should be ones with a high normal rated voltage. Therefore, in an attempt to transistorize the amplifiers, it is essential to use special transistors. That is, use cannot be made of transistors with a low breakdown voltage. This makes the amplifiers relatively expensive.

As information processing system in a simple computer such as a desk electronic computer, use is made of the serial system. As well known in the art, the serial system is a system for transferring information elements from one circuit to another circuit, effecting sequential digit-by-digit transfer through the use of one transmission channel for the purpose of obtaining the sum of two numbers, or effecting summation. Such serial system is advantageous in that a computer can be constructed with less elements since the information process can be achieved through the use of only one transmission channel irrespective of the number of digits of the information, except that its information processing speed is low. For this reason, this system has been utilized for a simple computer such as a desk electronic computer, as mentioned above.

In such a serial system computer, use is made of a feedback type memory unit such as a shift register. In order to indicate the numerical information stored in the shift register by means of indicator tubes, it is necessary to provide gate circuits in correspondence to the digits of the information. For example, 10 gate circuits are required when it is desired to display 10-digits of numerical information. Each gate circuit, if it is a binary type one, requires four gate elements. Furthermore, memory circuits are provided in correspondence to the gate circuits. Disadvantageously, this makes the mutual connection between the gate circuits and the memory circuits intricate.

Accordingly, it is an object of this invention to provide a visual display system adapted to operate a plurality of indicator tubes by means of a single common control device, that is, by means of a single gate circuit, decoder circuit and amplifier.

Another object of this invention is to provide a display system adapted for enabling indicator tubes to indicate information registered in a shift register by means of one common control device.

Still another object of this invention is to provide a display system by which the volume of the display apparatus can be decreased.

In accordance with this invention, the cathodes of identical forms of characters of the plurality of indicator tubes arranged in correspondence to information elements are connected with each other through common conductors with which is connected a single common control device. The information elements of the information to be displayed are converted to serial signals which are periodically and sequentially arranged. The common control device is successively controlled by the serial signals. On the other hand, the anodes of the indicator tubes are associated with means for periodically and sequentially distributing an operating potential thereto. The distributing means is so designed as to distribute the operating potential to the respective anodes in synchronism with said serial signals so that the desired one of the cathodes of each indicator tube is caused to periodically glow-discharge. In this way, desired information elements can be indicated on the respective indicator tubes.

The foregoing and other objects, features and advantages of this invention will become apparent from the following description taken in conjunction with the accompanying drawings, in which:

FIGS. 3a to 3e are time-charts useful for explaining the system of FIG. 2;

FIGS. 7a to 7i are views showing the time-charts in the respective portions of the circuit arrangement as shown in FIG. 4.

Figure 1:
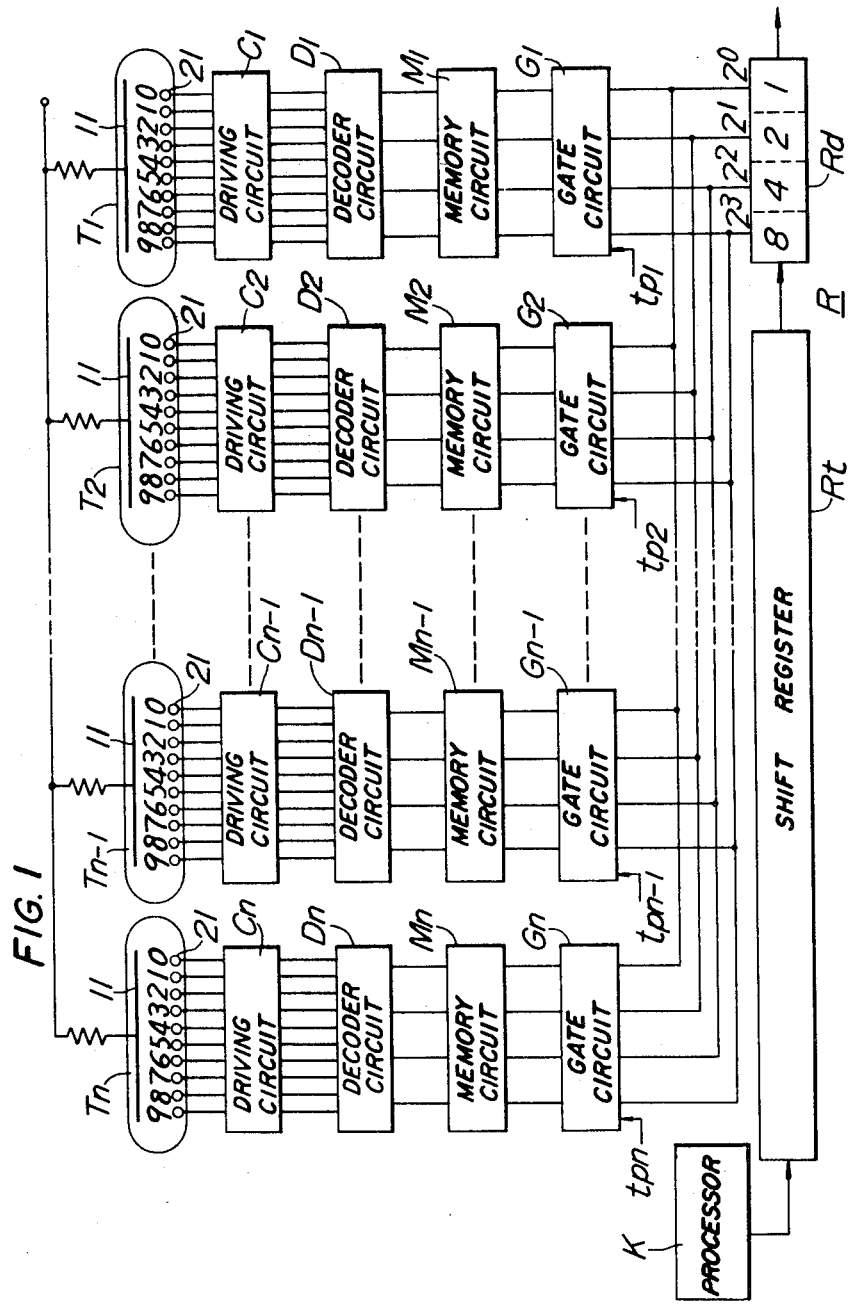
FIG. 1 is a block diagram showing a well-known display system.

In order to give better understanding of this invention, description will first be made of the conventional display system with reference to FIG. 1, wherein there is shown a system for displaying an $n$-digits decimal number. $T_1$ to $T_n$ represent indicator tubes. The number of the indicator tubes corresponds with the number of digits of numerical information to be displayed. Each of the indicator tubes $T_l$ to $T_n$ is provided with a single anode 11 and a plurality of cathodes 21 having the forms of the characters "0" to "9" respectively. $C_l$ to $C_n$ denote driving circuits for lighting the indicator tubes $T_l$ to $T_n$ respectively. Each driving circuit includes ten amplifiers connected with the respective cathodes of each indicator tube. $D_l$ to $D_n$ indicate decoder circuits for converting binary signals to decimal signals, each of the decoder circuits having four input terminals and 10 output terminals. $M_l$ to $M_n$ represent memory circuits, and $G_l$ to $G_n$ denote gate circuits each of which is composed of, for example, 10 switching devices. The gate circuits $G_l$ to $G_n$ are controlled by timing pulses $tp1$ to $tpn$. R indicates an $n$-bits shift register comprising a 4-bits readout shift register $Rd$ and an $(n-4)$-bits shift register $Rt$. The shift register R is coupled to an information processing circuit K. Identical binary signals are registered at the output terminal of the 4-bits shift register $Rd$ at a predetermined period T ($n$-bits time), so that timing pulses having a cyclic period T are applied to the respective gate circuits $G_l$ to $G_n$.

Now, assume that a binary signal "0101" which is the 1st-digit information element is registered in the 4-bits shift register $Rd$, for example. Then, the gate circuit $G_l$ is operated by the timing pulse $tp1$ to enable the binary signal "0101" to be stored in the memory circuit $M_t$ so that the binary signal is converted to a static signal, which is in turn supplied to the decoder circuit $D_t$ so as to be converted to a decimal signal. In turn, the resulting decimal signal is supplied to the driving circuit $C_t$ to cause the cathode "5" of the indicator tube $T_t$ to be glow-discharged. When a 2nd-digit binary signal is registered in the 4-bits shift register after the lapse of 4-bits time from the registration of the 1st-digit binary signal in the 4-bits shift register $Rd$, the gate circuit $G_2$ is operated by the timing pulse $tp2$ lagging behind the timing pulse $tp1$, so that the 2nd-digit number is indicated by the indicator tube $T_2$. In the same manner, upon registration of signals corresponding to the respective digit positions in the 4-bits shift register $Rd$, the corresponding gate circuits are operated so that the respective digits of the number to be represented are indicated on the corresponding indicator tubes.

As will be seen from what has been described above, with the conventional system, it is required that there be provided $n$ gate circuits, $n$ memory circuits, $n$ decoder circuits and $n$ driving circuits in correspondence with the number $n$ of the indicator tubes. This makes the display apparatus intricate and bulky.

Figure 2:
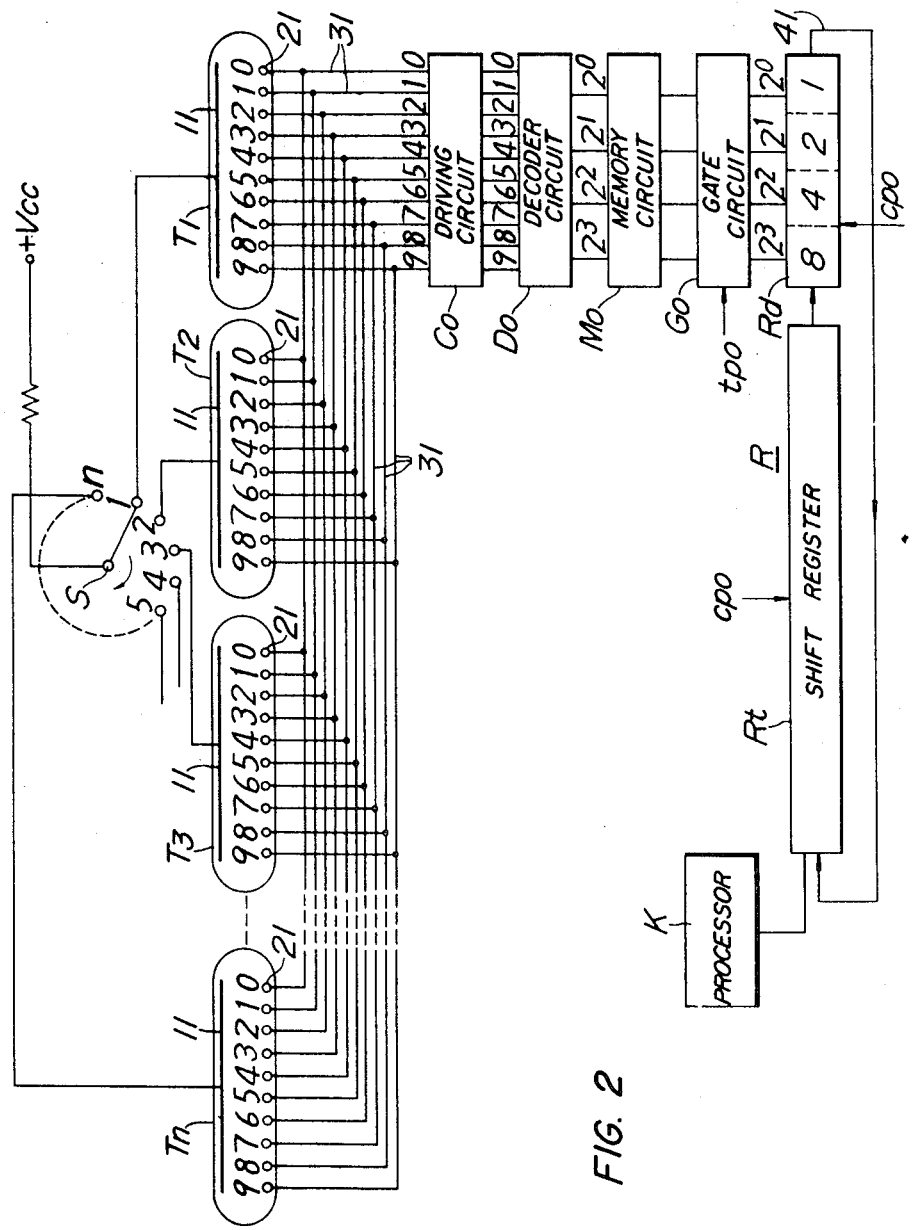
FIG. 2 is a block diagram showing the display system according to this invention.

FIG. 2 illustrates the system of this invention, which is adapted for visible display of information represented by an $n$-digits decimal number. In FIG. 2, $T_1$ to $T_n$ represent gas-filled indicator tubes each having one common anode 11 and a plurality of cathodes 21 having the forms of the characters "0" to "9" respectively. Each indicator tube is designed so that it may be caused to glow-discharge by applying a relatively 10 voltage across the cathode 21 and the anode 11. The number $n$ of the indicator tubes depends upon the number of digits of numerical information to be displayed. For displaying a 10-digits number, for example, 10 indicator tubes are required. The indicator tubes are provided in a predetermined spatial arrangement dependent upon numerical information to be represented, and they are orderly arranged from the left to the right so that if a 4-digits number "5412" is to be displayed for example, the tube $T_1$ indicates "2," $T_2$ "1," $T_3$ "4" "4" and $T_4$ "5" ($T_4$ is not shown). The cathodes shaped in the identical forms of character of the respective indicator tubes are connected with each other through ten common conductors 31, which are in turn coupled to a driving circuit $C_0$. The driving circuit $C_0$ includes electronic switching devices connected between the respective common conductors and reference potentials. Such switching devices may be composed of, for example, transistors. $D_0$ represents a decoder circuit adapted to convert a 4-digits binary signal to a 1-digit decimal signal. $M_o$ indicates a memory circuit adapted to convert a dynamic pulse signal to a static signal, and in an embodiment of this invention, such memory circuit is composed of four field effect transistors. $G_0$ denotes a gate circuit controlled by timing pulses $tpo$, and R represents an $n$-bits shift register of which the number of bits depends upon the number of digits of numerical information to be represented. For indicating a 10-digits decimal number, a 40-bits shift register is needed. $Rd$ represents a readout 4-bits shift register included in the shift register R, and $RT$ denotes the remaining register or $(n-4)$-bits shift register. The numerals 1, 2, 4 and 8 indicated on the register $Rd$ represents the respective bits. Binary signals $2^0$, $2^1$, $2^2$ and $2^3$ are registered in the 1, 2, 4 and 8 bit positions. The shift register R has a feedback transmission line 41 to periodically feed registered information elements back to the input in accordance with clock pulses $cpo$, and the register R is connected with an information processing circuit K to store counted results produced by the information processing circuit K. The circuit K is composed of, for example, a series type adder circuit. S represents a changeover switch for periodically and sequentially distributing an operating potential from a power source $Vcc$ to each indicator tube. The switch S may be an electronic switch. One of the important aspects of this invention is that the clock pulses $cpo$ and timing pulses $tpo$ are in synchronism with each other and the changeover switch S is operated in synchronism with the timing pulses $tpo$.

With reference to FIGS. 3a—3e, the operation of the system embodying this invention will now be described. FIG. 3a shows the shift pulses $cpo$ for the shift register, which have a cyclic period $Tc$. FIG. 3b shows the timing pulses $tpo$ which are generated in the absence of the shift pulses $cpo$. The cyclic period of the timing pulses is determined to be $4Tc$. $Tc$. FIG. 3c shows input signals of the memory circuit $M_0$, wherein the numerals $2^0$, $2^1$, $2^2$ and $2^3$ represent the respective digits of a binary signal. FIGS. 3d and 3e show the time when an anode voltage $Va$ is applied to the anode of each of the indicator tubes $T_1$ and $T_2$, respectively. Assume that one pulse $cpo$ was applied to the shift register R so that the 1st-digit binary signal "0101" has been registered in the 4-bits shift register $Rd$ (see FIG. 3c). Then, one timing pulse $tpo$ is generated in synchronism with said registration, as shown in FIG. 3b. Thus, the changeover switch S is connected with a position 1 in synchronism with said timing pulse $tpo$ so that the operating potential is supplied only to the anode 11 of the indicator tube $T_1$. The gate circuit is rendered conductive by the timing pulses $tpo$ so that the binary signal "0101" is supplied to the memory circuit $M_0$. The binary signal "0101" is held in the memory circuit $M_0$ until the subsequent timing pulse is generated. That is, the memory circuit $M_0$ holds the binary signal "0101" during the time $t1-t3$ as shown in FIG. 3c. When the binary signal "0101" is applied to the decoder circuit $D_0$, a signal voltage is produced at the output terminal "5" of the decoder circuit $D_0$. The signal voltage is supplied to the driving circuit $C_0$, thereby enabling the cathode electrode "5" of each indicator tube to assume the reference potential. At this time, since the changeover switch S assumes the position 1, the power source voltage $Vcc$ is applied only to the indicator tube $T_1$. Consequently, only the indicator tube $T_1$ is caused to glow-discharge, despite the fact that the cathodes "5" of all the indicator tubes are maintained at the reference potential. Subsequently, the 2nd-digit binary signal "0100" is registered in the 4-bits shift register after a lapse of a period of time $4Tc$ from the registration of the 1st-digit signal "0101" in the register $Rd$, and then the 2 2binary signal "0100" is stored in the memory circuit $M_0$ in accordance with the subsequent timing pulse $tpo$, thus causing the cathode "4" of each indicator tube to assume the reference potential. At this time, the changeover switch S is switched to the position 2 simultaneously with the application of the timing pulse $tpo$, so that only the cathode "4" of the indicator tube $T_2$ is caused to glow-discharge. Upon registration of the 3rd-digit binary signal "1000' in the 4-bits shift register $Rd$, only the cathode "8" of the indicator tube $T_3$ is lighted. In this way, after the indicator tube $T_n$ corresponding to the last digit or $n$th-digit has been lighted, the indicator tube $T_1$ corresponding to the 1st-digit is again lighted. Such operation is repeated at a cyclic period $4nTc$. By setting this cyclic period $4nTc$ shorter than the after image time of the human eyes, it is possible to effect continuous visible display of a predetermined number (..... 845) on the respective indicator tubes.

In accordance with this invention, if the cyclic period $Tc$ of the clock pulses $cpo$ is relatively long, then it is possible to make the time width $Tt$ (see FIG. 3b) of the timing pulses $tpo$ large. Thus, the memory circuit $M_0$ may be omitted. In this case, the period of time that the cathodes are maintained at the reference potential is equal to the time width $Tt$ of the timing pulses $tpo$, and therefore the time of the instantaneous glow-discharge of each indicator tube depends upon the time width $Tt$.

As will be seen from what has been described above, in accordance with this invention, the indicator tubes can effectively be operated by a single gate circuit, memory circuit and driving circuit.

Figure 4:
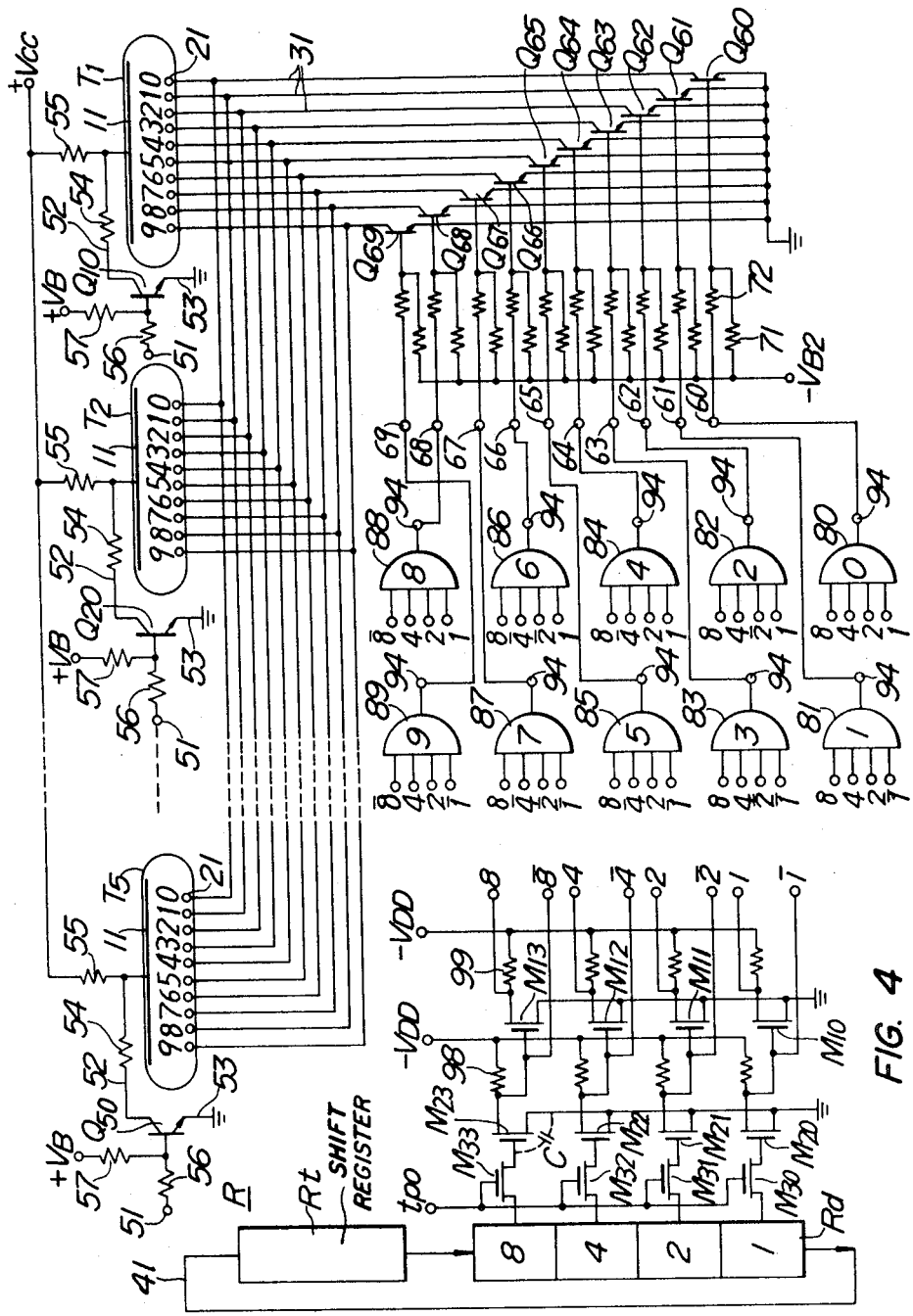
FIG. 4 shows the circuit arrangement according to an embodiment of this invention.
Figure 5:
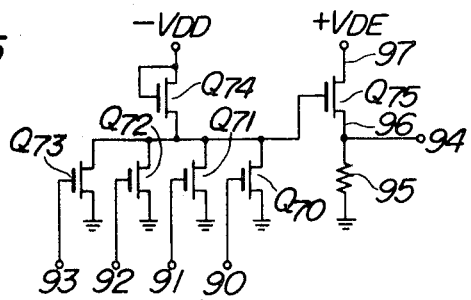
FIG. 5 shows the concrete circuit arrangement of the NAND gate shown in FIG. 4.
Figure 6:
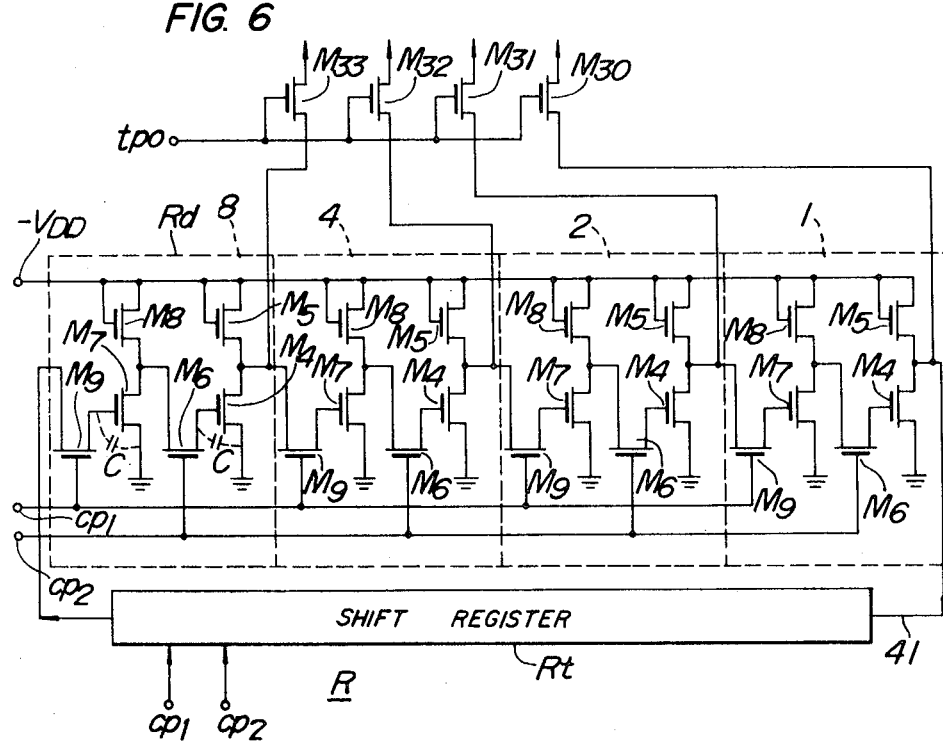
FIG. 6 shows the concrete circuit arrangement of the shift register shown in FIG. 4.

FIG. 4 shows the system according to an embodiment of this invention, which is adapted for display of a 5-digits decimal number. In FIG. 4, parts corresponding to those in FIG. 2 are indicated by similar reference numerals. $T_1$ to $T_5$ ($T_3$ and $T_4$ are not shown) represent indicator tubes adapted for indication of a 5-digits decimal number. The anodes 11 of the respective indicator tubes are connected with a power source Vcc (170V) through resistors 55. Q10 to Q50 denote switching transistors, the rated voltage of each switching transistor being higher than the power source voltage Vcc (the rated voltage being about 200 V). The common electrodes 53 of the respective transistors are connected with a reference potential source, and their output electrodes 52 are connected with the anodes 11 of the respective indicator tubes through resistors 54 (5K$\Omega$), respectively. Under the reference condition, the respective transistors are rendered conductive by a positive bias power source $V_B$ supplied thereto through resistors 57. Upon application of a negative pulse voltage to a terminal 51 through a resistor 56, the above transistors are rendered nonconductive. These transistors constitute the changeover switch S as shown in FIG. 2. The cathodes "0" to "9" of the indicator tubes $T_1$ to $T_5$ are connected with each other through common conductors 31, which are in turn connected with switching transistors Q60 to Q69, respectively. These transistors Q60 to Q69 are of NPN type having their base electrodes connected with a low negative bias power source $V_{B2}$ through resistors 71, respectively. Under the reference condition, the respective transistors Q60 to Q69 are rendered nonconductive, so that the cathodes of the respective indicator tubes are cut off from the reference potential source. When it is desired to cause the cathode of one of the indicator tubes to be glow-discharged, a positive voltage should be applied to the base electrode of the transistor connected with said cathode. The positive voltage is supplied from input terminals 60 to 69. If the positive voltage is applied to the base electrode of the associated transistor, then this transistor is rendered conductive so that the cathode of the associated indicator tube is connected with the reference potential source. For example, in case the cathode "0" is desired to be glow-discharged, the positive voltage should be applied to the input terminal 60 of the transistor Q60. The reference numerals 80 to 89 represent NAND circuits constituting a decoder circuit for converting a binary signal into a decimal signal. Each of the NAND circuits are formed by insulated gate-type field-effect transistors as shown by way of example in FIG. 5. The insulated gate-type field-effect transistors Q70 to Q75 as shown in FIG. 5 are of P channel enhancement mode. The field-effect transistors Q70 to Q74 constitute one of the NAND gates, which is operated by a negative DC power source $V_{DD}$. Q75 is a level converter adapted to convert a pulse voltage changing negatively with respect to the reference potential to a positive-going pulse voltage. The drain electrode 96 of the field-effect transistor Q75 is connected with the reference potential source through a resistor 95, and the source electrode 97 thereof is connected with a positive DC power source $V_{DE}$ of which the voltage is selected to be lower than the threshold voltage of the transistor Q75. When all the voltages applied to input terminals 90 to 93 of this NAND circuit are zero, a positive voltage can be obtained at its output terminal 94. Referring to FIG. 4, the output terminals 94 of the NAND circuits 80 to 89 are connected with terminals 60 to 69, respectively. $M_{20}$ to $M_{23}$ represent memory elements each composed of an insulated gate-type field-effect transistor to utilize the gate input capacitance of the latter. As well known in the art, the insulated gate-type field-effect transistor has so high a gate input resistance that a pulse voltage instantaneously applied to the gate thereof can be stored in the gate input capacitance for a predetermined period of time (for example, for 1 second). $M_{10}$ to $M_{13}$ denote inverter insulated gate-type field-effect transistors which are directly connected with the storage insulated gate-type field-effect transistors $M_{20}$ to $M_{23}$, respectively. Output terminals 1, $\bar{1}$, 2, $\bar{2}$, 4, $\bar{4}$, 8 and $\bar{8}$ are provided on the gate electrodes and the drain electrodes of these transistors. These output terminals are in turn connected with the input terminals of the aforementioned NAND circuits 80 to 89, respectively. This connection is made in correspondence with the reference numerals indicated at the input terminals of the NAND circuit, although such connection is not shown in the drawing. $M_{30}$ to $M_{33}$ represent gating insulated gate-type field-effect transistors, to the gate electrodes of which are applied timing pulses *tpo*. The field-effect transistors $M_{30}$ to $M_{33}$ are nonconductive under the reference condition, and upon application of the timing pulses *tpo* thereto, they are rendered conductive. R*d* indicates a read-out 4-bits shift register, wherein the numerals 1, 2, 4 and 8 represent the bit positions where binary-coded decimal numbers are registered. As shown in FIG. 6, the shift register R*d* is composed of insulated gate-type field-effect transistors, and each unit bit circuit thereof is formed by six insulated gate-type field-effect transistors $M_4$ to $M_9$. As well known in the art, such shift register utilizes the storage action by the gate input capacitances C of the inverter transistors $M_7$ and $M_4$ and which is characterized by the fact that binary signals are shifted by means of two clock pulses *cp*1 and *cp*2 applied to the gating transistors $M_9$ and $M_6$. R*t* represents a 16-bits shift register each unit bit circuit of which is formed by six insulated gate-type field-effect transistors and driven by two clock pulses *cp*1 and *cp*2, as is the case with the shift register R*d*. All the insulated gate-type field-effect transistors described above are of P channel enhancement mode. The shift register, NAND circuit using transistors can easily be miniaturized by the microelectronics technique. The reason is that the method of fabricating the insulated gate-type field-effect transistor is simple, and that in an attempt to form a number of insulated gate-type field-effect transistors in a single semiconductor body, no special means for electrically insulating the transistors from each other is required. The insulated gate-type field-effect transistor is also advantageous in that it can be used as temporary storage element. This is based on the fact that the insulated gate-type field-effect transistor has a high gate input resistance and a suitable gate input capacitance. The field-effect transistors $M_{20}$ to $M_{23}$ in FIG. 4 used an storage elements are so designed as to store the information instantaneously read out from the shift register R*d* through the gate circuit formed by the field-effect transistors $M_{30}$ to $M_{33}$, until the subsequent information is read out from the shift resistors R*d*. A further advantage of the insulated gate-type field-effect transistor is its smaller power consumption. This eliminates the problem of heat generation in the control device.

As will be appreciated from what has been described above, it is possible to greatly decrease the volume occupied by the display apparatus by composing the common control device for the indicator tubes through the use of insulated gate-type field-effect transistors.

With reference to FIGS. 7*a* to 7*i*, description will now be made of the operation of the present system. FIGS. 7*a* and 7*b* show clock pulses *cp*1 and *cp*2 applied to the shift register, respectively. FIG. 7*c* shows numerical information $V_R$ registered in the shift register. The numerical information $V_R$ is periodically and sequentially registered in the 20-bits shift register R by way of binary signals, and it is in synchronism with the clock pulses *cp*2. In the case shown in the drawing, the registered numerical information is "35728." FIG. 7*d* shows timing pulses *tpo* applied to the gate circuits ($M_{30}$ to $M_{33}$). FIGS. 7*e*, *f*, *g*, *h* and *i* show control pulse voltages applied to the control electrodes 51 of transistors Q10, Q20, Q30, Q40 and Q50, respectively. The clock pulses *cp*1 and *cp*2 are out of phase with each other, and the timing pulses *tpo* are generated in the absence of the clock pulses *cp*2. Assume that the cyclic period of the clock pulses *cp*1 and *cp*2 is Tc, then the cyclic period of the timing pulses *tpo* will be given by 4Tc. Control pulses C10, C20, C30, C40 and C50 are in synchronism with the timing pulses *tpo*. The cyclic period of the control pulses is 5 times as long as that of the timing pulses *tpo*, and their pulse width is equal to the cyclic period 4Tc of the timing pulses *tpo*. These control pulses are produced periodically and sequentially. In this example, the frequency of the clock pulses *cp*1 and *cp*2 is 10 kc./s. (Tc=100 microseconds), and the pulse width is 10 microseconds. Thus, the frequency of the timing pulses *tpo* is set at 2.5 kc./s., and the pulse width of the control pulses at 400 microseconds (the frequency at 500 c./s.). The pulse width of the timing pulses *tpo* is 10 microseconds.

Upon registration of the 1st-digit binary signal "1000" in synchronism with the clock pulse $cp2$, the timing pulse $tpo$ is applied to the transistors $M_{30}$ to $M_{33}$. Thus, the transistors $M_{30}$ to $M_{33}$ are rendered conductive for a period of time corresponding to the pulse time width (10 microseconds) of the timing pulse $tpo$, so that the binary signal "1000" is stored in the storage transistors $M_{20}$ to $M_{23}$. That is, a negative voltage is stored in the gate input capacitance C of the transistor $M_{23}$, and zero voltage are stored in the gate input capacitances of the transistors $M_{20}$, $M_{21}$ and $M_{22}$. As a result, voltages 0, 0, 0 and $-V_{DD}$ are produced at the output terminals 1, 2, 4 and 8, respectively (the voltages at the output terminals $\bar{1}$, $\bar{2}$, $\bar{4}$ and $\bar{8}$ are $-V_{DD}$, $-V_{DD}$, $-V_{DD}$ and 0, respectively). The NAND circuit 88 is operated by these voltages so that a positive voltage is produced at the output terminal 94, thereby rendering the transistor Q68 conductive. In this way, the cathodes "8" of the indicator tubes are connected with the reference potential source. Such state is maintained until the 2nd-digit binary signal is registered in the shift register R$d$ and it is stored in the memory transistors $M_{20}$ to $M_{23}$ in accordance with the timing pulse $tpo$. When the cathodes "8" are caused to assume the reference potential by the 1st-digit binary signal, the negative control pulse C10 is simultaneously applied to the transistor Q10 to render the latter nonconductive, so that a voltage needed for glow-discharge is applied to the anode 11 of the indicator tube $T_1$. Consequently, only the cathode "8" of the indicator tube $T_1$ is caused to glow-discharge so as to be lighted.

After the lapse of 4-bits time (400 microseconds) from the registration of the 1st-digit binary signal in the shift register R$d$, the 2nd-digit binary signal "0010" is registered in the shift register R$d$. At this time, the subsequent timing pulse $tpo$ is generated to render the gating transistors $M_{30}$ to $M_{33}$ conductive. Thus, the 2nd-digit binary signal is stored in the memory transistors $M_{20}$ to $M_{23}$, whereby the NAND circuit 82 is operated to render the transistor Q62 conductive, thus causing the cathodes "2" of the indicator tubes to assume the reference potential. At the same time, the transistor Q20 is rendered nonconductive by the negative control pulse $C_{20}$, so that only the cathode "2" of the indicator tube T2 is caused to glow-discharge. Similarly, the cathode "7" of the indicator tube $T_3$ is caused to glow-discharge when the 3rd-digit binary signal "0111" is registered in the shift register R$d$, the cathode "5" of the indicator tube $T_4$ is caused to glow-discharge when the 4th-digit binary signal "0101" is registered in the shift register R$d$, and then the cathode "3" of the indicator tube $T_5$ is caused to glow-discharge when the 5th-digit binary signal "0011" is registered in the shift register R$d$. After the lapse of 4-bits time or 400 microseconds (4T$c$) from the registration of the 5th-digit binary signal "0011" in the shift register R$d$, the 1st-digit binary signal "1000" is again registered in the shift register R$d$, so that the cathode "8" of the indicator tube $T_1$ is again caused to glow-discharge.

By lighting the respective indicator tubes periodically and sequentially in the above manner, observation can be made as if the cathodes "8," "2," "7," "5" and "3" of the indicator tubes $T_1$ to $T_5$ were continuously caused to glow-discharge, by virtue of the after image effect of the human eyes. Thus, the numerical information "35728" registered in the shift register R can be visually displayed.

Although in the foregoing embodiment of this invention the frequency of the clock pulses $cp1$ and $cp2$ was set at 10 kc./s., it can be selected to be lower than 10 kc./s., since the shift register of the above type formed by insulated gate-type field-effect transistors can be operated by clock pulses of a frequency ranging from 70 c./s. to 200 kc./s. If the frequency of the clock pulses is made lower, then the pulse width of the timing pulses $tpo$ can be made sufficiently long, which makes it possible to eliminate the memory transistors $M_{20}$ to $M_{23}$. Assuming that the frequency of the clock pulses $cp1$ and $cp2$ is set at 1 kc./s., for example, then their cyclic period becomes 1 millisecond so that the pulse width of the timing pulses $tpo$ can be made to be 400 microseconds, thus making it possible to remove the memory transistors.

It is difficult to immediately determine the time of the instantaneous glow-discharge required of each indicator tube, since such time depends upon the repetition frequency of the discharge and the operating current of the indicator tube. Empirically, at least 100 microseconds are needed. In the example described above, the glow-discharge time is about 400 microseconds since it depends upon the time during which the control pulse is applied.

As will be seen from what has been described above, the present system is characterized in that operating potentials are periodically and sequentially applied to the anodes of the indicator tubes in synchronism with the timing pulses controlling the gate circuits. Thus, in accordance with the present invention, it is possible to simplify the control device for the indicator tubes.

While in the foregoing, by way of example, description has been made of the case where the present invention was applied to the display of numerical information, it will be readily apparent to those skilled in the art that the present invention can equally be applied to the display of information represented by characters such as the alphabet other than numerals.

We claim:

1. An electronic display system comprising:
   a. a plurality of indicator tubes provided in a predetermined spatial arrangement dependent upon information to be displayed, each of said indicator tubes comprising a gas-filled envelope, one common anode and a plurality of cathodes disposed therein, said cathodes being shaped in the form of characters suitable to represent the respective information elements of said information, each of said indicator tubes being responsive to a relatively high operating potential supplied between the cathode and the anode thereof for effecting a glow-discharge;
   b. a plurality of common conductors for connecting the cathodes of identical forms of character of said indicator tubes with each other;
   c. a plurality of first electronic switching means connected with said plurality of common conductors respectively, each of said first switching means having a control electrode for controlling the potential of each of said cathodes in accordance with a first control signal;
   d. a shift register having a feedback means connected between an output terminal and an input terminal thereof for storing binary signals of the information to be displayed, said binary signals being shifted by at least one clock pulse having a predetermined cyclic period, thereby said binary signals are caused to be circulated in said shift register;
   e. a gate circuit connected with said shift register for reading out said binary signals stored in said shift register, said gate circuit being controlled by a timing pulse in synchronism with said clock pulse;
   f. a decoder circuit connected with said gate circuit for supplying said first control signal to the control electrode of said first switching means in accordance with said binary signals passing through said gate circuit;
   g. a power source means for supplying said operating potential to the anode of each of said indicator tubes; and
   h. means for distributing said operating potential from said power source means to the anode of each indicator tube in synchronism with said timing pulse, said distributing means being connected between said power source means and the respective anodes.

2. An electronic display system as set forth in claim 1, wherein said distributing means is composed of a plurality of second electronic switching means, each of said second switching means being connected with the anode of each indicator tube and operated by a second control signal in synchronism with said timing pulse.

3. An electronic display system as set forth in claim 1, wherein the cathodes of the indicator tubes are shaped in the forms of the numerals "0" to "9," and said indicator tubes are so arranged as to display numerical information.

4. An electronic display system as set forth in claim 1, wherein memory elements are connected with the gate circuit, thereby effectively applying said first control signal to the control electrodes of said first switching means.

5. An electronic display system as set forth in claim 4, wherein the memory elements are composed of insulated gate-type field-effect transistors.

6. An electronic display system as set forth in claim 1, wherein memory elements are connected with the decoder circuit, thereby effectively applying said first control signal to the control electrodes of said first switching means.

7. An electronic display system as set forth in claim 6, wherein the memory elements are composed of insulated gate-type field-effect transistors.

8. An electronic display system as set forth in claim 1, wherein said shift register and said gate circuit are composed of insulated gate-type field-effect transistors.

9. An electronic display system comprising:
   a. a plurality of indicator devices each having a common anode electrode and a plurality of cathode electrodes;
   b. means for connecting corresponding cathode electrodes of said indicator devices to each other;
   c. first switching means having first control terminals for causing one group of said cathodes connected together to have a first predetermined electrical potential in response to a first control signal supplied to said first control terminals thereof;
   d. second switching means connected to each of said anodes and having second control terminals for causing different ones of said anodes selectively to receive a second predetermined electrical potential in sequence in response to a second control signal supplied to said second control terminals thereof;
   e. an N bit shift register for storing N bit binary signals therein, the number N being not less than 4, said binary signals being shifted by at least one clock pulse, comprising a first N-4 bit shift register for storing N-4 bit binary signals, a second 4 bit shift register for storing 4 bit binary signals series-connected with said first shift register, said second shift register comprising 4 unit bit circuits, each unit bit circuit including at least 4 insulated-gate-type field-effect transistors, and feedback means connected between an output of said second shift register and an input of said first shift register;
   f. means for reading and memorizing said 4 bit binary signals stored in said second shift register comprising a first and a second group of 4 insulated-gate-type field-effect transistors, each transistor of said groups having a control electrode and a first and a second output electrode, means connecting a voltage supply source between said first and second output electrodes of of each transistor of said first group, means connecting each of said control electrodes of said first group of transistors with each of said second output electrodes of said second group of transistors, respectively, means supplying a timing pulse signal to said control electrodes of said second group of transistors, said timing pulse signal being in synchronism with said clock pulse signal in said N bit shift register and said second control signal in said second switching means, and means coupling each of said first output electrodes of said second group of transistors with each of said unit bit circuits of said second shift register, respectively; and
   g. decoder means for decoding said binary signals into decimal signals coupled between said first control terminals of said first switching means and said reading out and memorizing means.

10. The electronic display system according to claim 9, wherein said timing pulse signal has a cyclic period of 4 times that of said clock pulse.

11. The combination comprising:
   a. an N bit shift register for storing N bit binary signals therein, the number of N being not less than 4, comprising a first N-4 bit shift register for storing N-4 bit binary signals therein said first shift register having an input terminal and an output terminal, and a second 4 bit shift register for storing 4 bit binary signals therein, said second shift register comprising: first, second, third and fourth unit circuits, each unit circuit comprising first, second, third and fourth insulated-gate-type field-effect transistors, each transistor having a first control terminal and first and second output terminals, means connecting said second output terminal of said first transistor with said first control terminal of said second transistor, means connecting said second output terminal of said second transistor with said first output terminal of said third transistor, means connecting said second output terminal of said third transistor with said first control terminal of said fourth transistor, and means maintaining the potential of said first output terminals of said second and fourth transistors to a reference potential, means connecting the first output terminals of the first transistors in said second, third and fourth unit circuits with the second output terminals of the fourth transistors in said first, second and third unit circuits, respectively; means supplying a first clock pulse signal to the first control terminal of the first transistor in each of said unit circuits; means supplying a second clock pulse signal to the first control terminal of the third transistor in each of said unit circuits, said second clock pulse signal being out of time phase with said first clock pulse signal and having the same cyclic period as said first clock pulse; a first voltage supply source; and first load impedance means respectively connected between said first voltage supply source and the second output terminals of the second and fourth transistors in each of said unit circuit;
   b. means connecting said first output terminal of said first transistor in said first unit circuit constructing said second shift register with said output terminal of said first shift register;
   c. feedback means connected between said second output terminal of said fourth transistor in said fourth unit circuit constructing said second shift register and said input terminal of said first shift register;
   d. a gate circuit comprising: fifth, sixth, seventh and eighth insulated-gate-type field-effect transistors, each transistor having a second control terminal and third and fourth output terminals; means connecting the third output terminals of said fifth, sixth, seventh and eighth transistors with said first, second, third and fourth unit circuits in order to read out said binary signals stored therein, respectively; and means supplying a timing pulse signal to said second control terminals of said fifth, sixth, seventh and eighth transistors, said timing pulse signal being in synchronism with said first clock pulse signal; and
   e. a memory circuit comprising: ninth, tenth, eleventh and twelfth insulated-gate-type field-effect transistors, each transistor having a third control terminal and fifth and sixth output terminals; means connecting said third control terminals of said ninth, tenth, eleventh and twelfth transistors with said fourth output terminals of said fifth, sixth, seventh and eighth transistors, respectively; means maintaining the potential of said fifth output terminals of said ninth, tenth, eleventh and twelfth transistors to the reference potential; a second voltage source; and second load impedance means respectively connected between said second voltage supply source and said sixth output terminals of said ninth, tenth, eleventh and twelfth transistors.

12. The combination defined in claim 11, wherein each of said first and second load impedance means comprises an insulated-gate-type field-effect transistor having a gate, source and drain electrodes, said gate electrode being connected with said drain electrode.

13. The combination defined in claim 11, wherein said means connecting the third output terminals of said fifth, sixth, seventh and eighth transistors with said first, second, third and fourth unit circuits comprises connecting said third output terminals with said second output terminals of said fourth transistors in said first, second, third and fourth unit circuits, respectively.

14. The combination defined in claim 11, wherein said timing pulse signal has a cyclic period of 4 times as long as said first clock pulse signal.